United States Patent
Shimizu et al.

[11] Patent Number: 5,963,221
[45] Date of Patent: Oct. 5, 1999

[54] DEVICE FOR WRITING AND READING OF SIZE REDUCED VIDEO ON A VIDEO SCREEN BY FIXING READ AND WRITE OF ALTERNATING FIELD MEMORIES DURING RESIZE OPERATION

[75] Inventors: Yutaka Shimizu; Kazunori Chida, both of Ota, Japan

[73] Assignee: Sanyo Electric Co., Ltd., Osaka, Japan

[21] Appl. No.: 08/732,845

[22] Filed: Oct. 15, 1996

[30] Foreign Application Priority Data

Oct. 16, 1995 [JP] Japan ................................ 7-267108

[51] Int. Cl.[6] .......................... H04N 5/45; H04N 1/393; G09G 5/00; G09G 5/14; G09G 5/36
[52] U.S. Cl. ...................... 345/508; 348/565; 348/567; 348/581
[58] Field of Search ...................... 348/565, 567, 348/552, 581, 715; 345/342, 508, 511, 512, 510, 516, 509, 515; 382/298

[56] References Cited

U.S. PATENT DOCUMENTS

| | | | |
|---|---|---|---|
| 4,961,071 | 10/1990 | Kroos | 345/340 |
| 5,471,577 | 11/1995 | Lightbody et al. | 345/340 |
| 5,510,846 | 4/1996 | Guichard et al. | 348/511 |
| 5,517,612 | 5/1996 | Dwin et al. | 348/715 |
| 5,557,302 | 9/1996 | Levinthal et al. | 345/509 |
| 5,561,472 | 10/1996 | Marietta et al. | 348/565 |
| 5,594,467 | 1/1997 | Marlton et al. | 345/115 |

*Primary Examiner*—Mark R. Powell
*Assistant Examiner*—Jeffrey Allen Rossi
*Attorney, Agent, or Firm*—Loeb & Loeb LLP

[57] ABSTRACT

An input video signal is reduced according to size reduction ratio data K in an input processing section and written into alternate field memories. The written reduced video signal is alternately read from the field memories in a display processing section and processed for window displaying. Video reduction control sections are provided on the respective input and display sides, so that various signals, such as RHOLD, ADCANS, RACK signals, etc., are exchanged therebetween. When a size reduction ratio data K is changed, on the display side a read memory is fixed on a first field memory and size data is fixed, while on the write side video data is written into a second field memory, based on the new reduction ratio. After updating the size data on the display side, video data is read from the second field memory at the new reduction ratio. When reading and writing operations with respect to the second field memory are finished, fixing of the respective memories is released, whereby a signal processing operation returns to a normal operation.

13 Claims, 9 Drawing Sheets

DEVICE FOR WRITING AND READING OF SIZE REDUCED VIDEO ON A VIDEO SCREEN BY FIXING READ AND WRITE OF ALTERNATING FIELD MEMORIES DURING RESIZE OPERATION

BACKGROUND OF THE INVENTION

1. Field of the Invention:

The present invention relates to a reduced video signal processing circuit for displaying a reduced input video scene in a window, using a buffer memory, such as a field memory, a frame memory, or the like, wherein the reduction ratio is changeable.

2. Description of the Prior Art:

A Picture in Picture (PIP) function has been generally known as a TV display function for displaying a plurality of scenes in the form of a window on one TV screen, instead of displaying one scene on the entire TV screen. With the arrival of the multimedia era, a further variety of display functions have been demanded. In particular, a window displaying function at a desired reduction ratio, which has become commonly used as an operating environment for personal computers, has also been demanded for TV displaying. In order to display a separate scene in the form of a window, a buffer memory, such as a field memory, a frame memory, etc., is necessary in order to retain synchronism between main and sub-scenes (inset-scenes).

FIG. 6 is a block diagram showing a conventional reduced video signal processing circuit.

A video signal for a sub-scene which is displayed in the form of a window is input into an input processing section 1 which includes a filter circuit 10. The input video signal is then processed for size reduction (filtered) by the filter circuit 10 according to size reduction ratio data K before being provided to field memories 2 and 3. A writing operation to the field memories 2 and 3 is controlled by an input video clock generator 5 in a control block 4. The control block 4 is also provided with a display video clock generator 6 for controlling a reading operation from the memories 2 and 3. Size reduction ratio data K are externally received, and the input video clock generator 5 supplies the data K to the input processing section 1.

Based on a horizontal synchronizing signal (Input H) and vertical synchronizing signal (Input V) of an input video signal received, the input video clock generator 5 outputs a write clock (WCLK), write enabling signals (WE1, WE2), and a write reset signal (WRST). A WCLK has the same rate as that of a pixel clock synchronous with an input H. WE1 and WE2 signals cause the field memories 2 and 3 to be at an enable state alternately for every field during an effective display period of an input video signal. The field memories 2 and 3 incorporate address counters for independently addressing during writing and reading operations. After the counters are reset by a WRST signal, addresses of the counters are incremented by counting a WCLK while WE1 and WE2 signals are at an H (high) level, whereby a reduced video signal supplied from the input processing section 1 is written into the field memories 2 and 3. When size reduction ratio data K indicates "1," that is, when a reduction operation is not executed, WE1 and WE2 signals remain at an H level throughout an effective video period. When size reduction ratio data K is smaller than "1," on the other hand, the period when WE1 and WE2 signals are at an H level is adjusted according to the size reduction ratio data K. For instance, with size reduction ratio data K is "½," as shown in FIG. 7, WE1 and WE2 signals are output at an H or L level in such a way that they become an H level for every other pixel. As a result, an input video signal subjected to half thinning processing in the filter 10 can be written into a memory.

Further, the input video clock generator 5 computes video size data (SIZ), based on the size reduction ratio data K, and supplies the SIZ data to the display video clock generator 6. For instance, provided that the numbers of horizontal and vertical pixels of an input video signal are "640" and "480," respectively, and the size reduction ratio data K is "½," SIZ data is computed to indicate H (horizontal) SIZ "320" and V (vertical) SIZ "240."

On the read side, in order to read a reduced video signal from the field memories 2 and 3, the display video clock generator 6 is supplied with a horizontal synchronizing signal (display H) and a vertical synchronizing signal (display V) of a display video signal for a main scene and a display position data (X, Y) for indicating a display position of a reduced scene, and outputs a read clock (RCLK), read enabling signals (RE1, RE2), and a read reset signal (RRST). An RCLK has the same rate as that of a pixel clock synchronous with a display H. RE1 and RE2 signals cause the field memories 2 and 3 to be at an enable state alternately for every field during an effective display period of a display video signal. An RRST signal resets a read address counter of the field memories 2 and 3 upon a rise of an RE signal. After the counters are reset by an RRST signal, a read address of the counters in the field memories 2 and 3 is incremented by counting an RCLK while RE1 and RE2 signals are at an H level, whereby a reduced video signal is read from the field memories 2 and 3. Note that the display video clock generator 6 may generate display H and V signals in cases where each timing thereof is previously known, so that an RRST signal, an RCLK, RE1 and RE2 signals, etc., are generated based on the display H and V signals.

FIG. 9 illustrates an input video signal A displayed in the form of a window, wherein display position data (X, Y) indicates a display position of a sub-scene with respect to a main scene (a display video signal), and video size SIZ data (H, V) indicates the size of a sub-scene to be displayed in the form of a window (a reduced video signal generated from an input video signal). For achieving such a window display, the display video clock generator 6 causes RE1 and RE2 signals to be at an H level only during an effective display period as shown in FIG. 7, based on the SIZ data (H, V) and the video position data (X, Y). In this case, RE1 and RE2 signals are continuously maintained at an H-level throughout an effective display period, which is different from the input side.

The display video clock generator 6 supplies SIZ data (H, V) and video position data (X, Y) to a display processing section 7 which is provided downstream of the field memories 2 and 3 so that the reduced video signal read from the memories 2 and 3 are processed therein for window displaying through framing or addition of background data, and output as a display video signal.

In order to change a reduction ratio as desired in the foregoing procedure, the content of processes executed on the write and read sides must be changed in accordance with respective new reduction ratio data. However, if the content of a process is changed at the midst of reading and writing operations, distortion may be caused to a display video signal (displaying scene). Thus, an operation for changing a reduction ratio is executed during a vertical blank interval of a video to prevent distortion.

However, since an input V and a display V are not synchronous with each other, the above changing operation is conducted at different timings on the write and read sides. An example is taken, referring to FIG. 7, where a phase of a display V is delayed compared to that of an input V. When size reduction ratio data K is newly input at time T1, the reduction ratio is changed to the new ratio during a vertical blank period NP1 which is an immediately following interval of the time T1 in the input video clock generator 5 and the input processing section 1, so that a reduction operation and a write control operation are thereafter conducted based on the new reduction ratio. In the display video clock generator 6 and the display processing section 7, on the other hand, the reduction ratio is changed during a vertical blank period DP1 which is also an immediately subsequent interval to the time T1. Since this timing (DP1) is behind the changing timing on the input side (NP1), a video signal written in the changed reduction ratio is read from the memory in the changed reduction ratio after the time DP1.

In another case, referring to FIG. 8, where reduction ratio data is newly input at time T2 which is after the vertical blank interval NP1 of an input V and before the vertical blank interval DP1 of a display V, a reduction ratio is changed during a vertical blank interval NP2 after the time T2 in the input video clock generator 5 and the input processing section 1, and during a vertical blank interval DP1, before the interval NP2, in a display video clock generator 6 and the display processing section 7. In other words, the reduction ratio is changed on the display side prior to the input side. As a result a video signal reduced in a previous reduction ratio (a reduction ratio before the change) is read in a changed reduction ratio to be displayed for a field subsequent to the change (DP1) on the read side. This causes significant distortion to a video displayed in the window. For this reason, the prior art has a problem in that a reduction ratio cannot be changed while a window display continues.

SUMMARY OF THE INVENTION

The present invention aims to provide a method of and a device for reading and writing a reduced video without causing distortion to a displaying scene, wherein reduction ratio can be changed at any time According to the present invention, an input video signal is reduced according to a reduction ratio to form reduced video data which are alternately written into two buffer memories. The reduced video data are then alternately read from the two buffer memories so as to obtain a display video signal.

During the above procedure, if the reduction ratio is changed, a read memory is fixed on one of the buffer memories so that reading of reduced video data from that memory begins. After completion of read memory fixing, a write memory is fixed on the other buffer memory so that reduced video data is written thereto in the new (changed) reduction ratio. Upon completion of this writing, a read memory is switched to the memory containing reduced video data written in the new reduction ratio thereto, and reading of data therefrom is begun. Once the reading starts, the write memory is switched. Thereafter, write and read memories are successively switched for every completion of writing and reading operations with respect to the respective buffer memories.

As described above, read and write memories are tentatively fixed when a reduction ratio is changed. Thus, the reduction ratio of a display video signal can be always changed whenever a reduction ratio is changed after data was written in a changed reduction ratio, so that distortion to a displaying scene can be prevented. That is, a reduction ratio can be changed while a reduced video remains displayed in a window.

Reading and writing memories may be changed during a vertical blank intervals which present for every vertical synchronous period of an input video signal and a display video signal, respectively.

A construction in which read and write circuits are structured separately such that a plurality of signals can be exchanged therebetween will enable the foregoing operation.

In the thus structured circuits, reading and writing operations can be controlled separately. Thus, even though synchronous signals of input and display video signals have differing frequencies, there will be caused no display problems.

BRIEF DESCRIPTION OF THE DRAWINGS

The above and other objects, features, and advantages will be further apparent from the following description of the preferred embodiment taken in conjunction with the accompanying drawings wherein.

DESCRIPTION OF THE PREFERRED EMBODIMENTS

Figure 1:
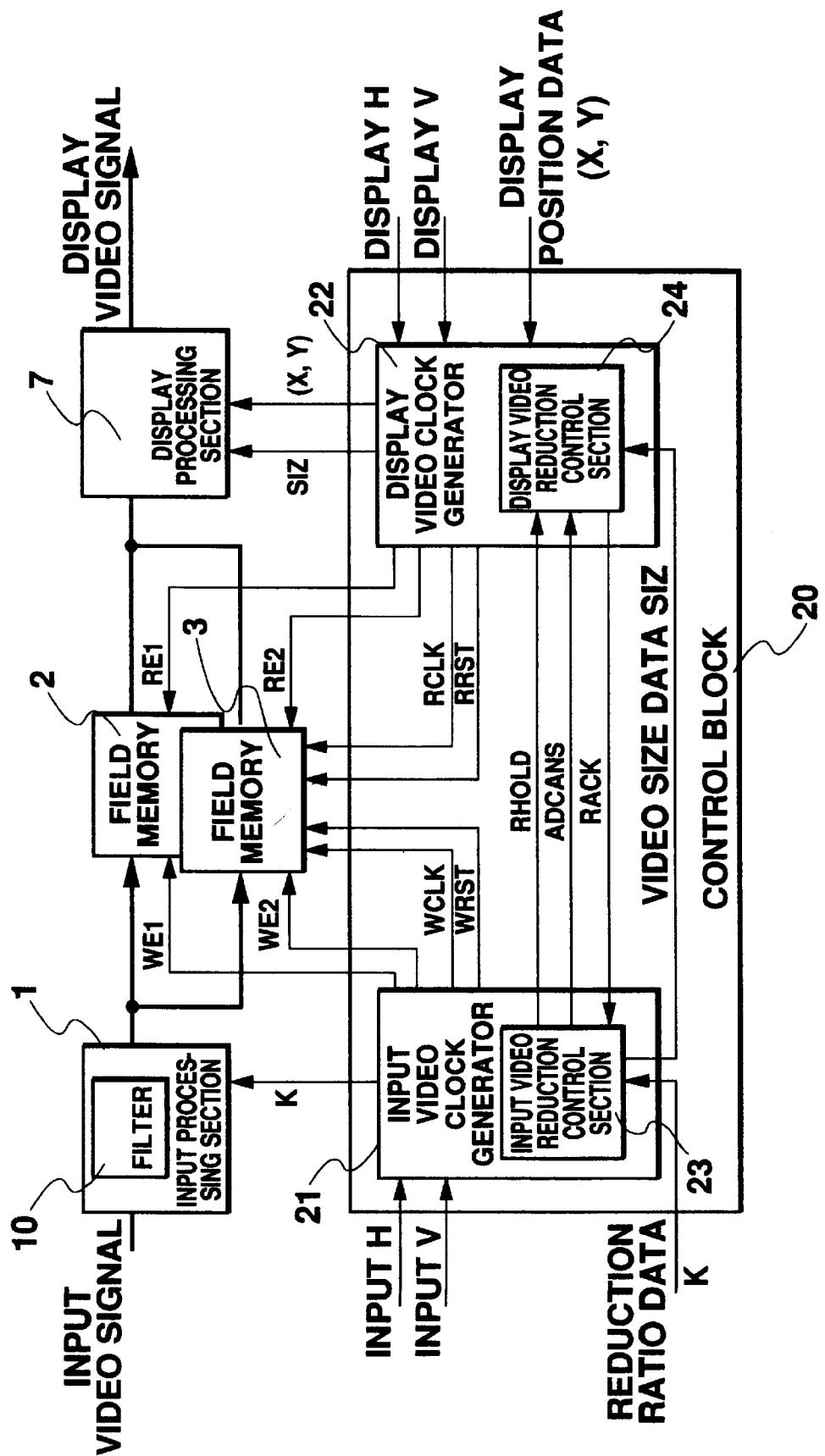
FIG. 1 is a block diagram illustrating a reduced video signal processing circuit of the present invention.
Figure 6:
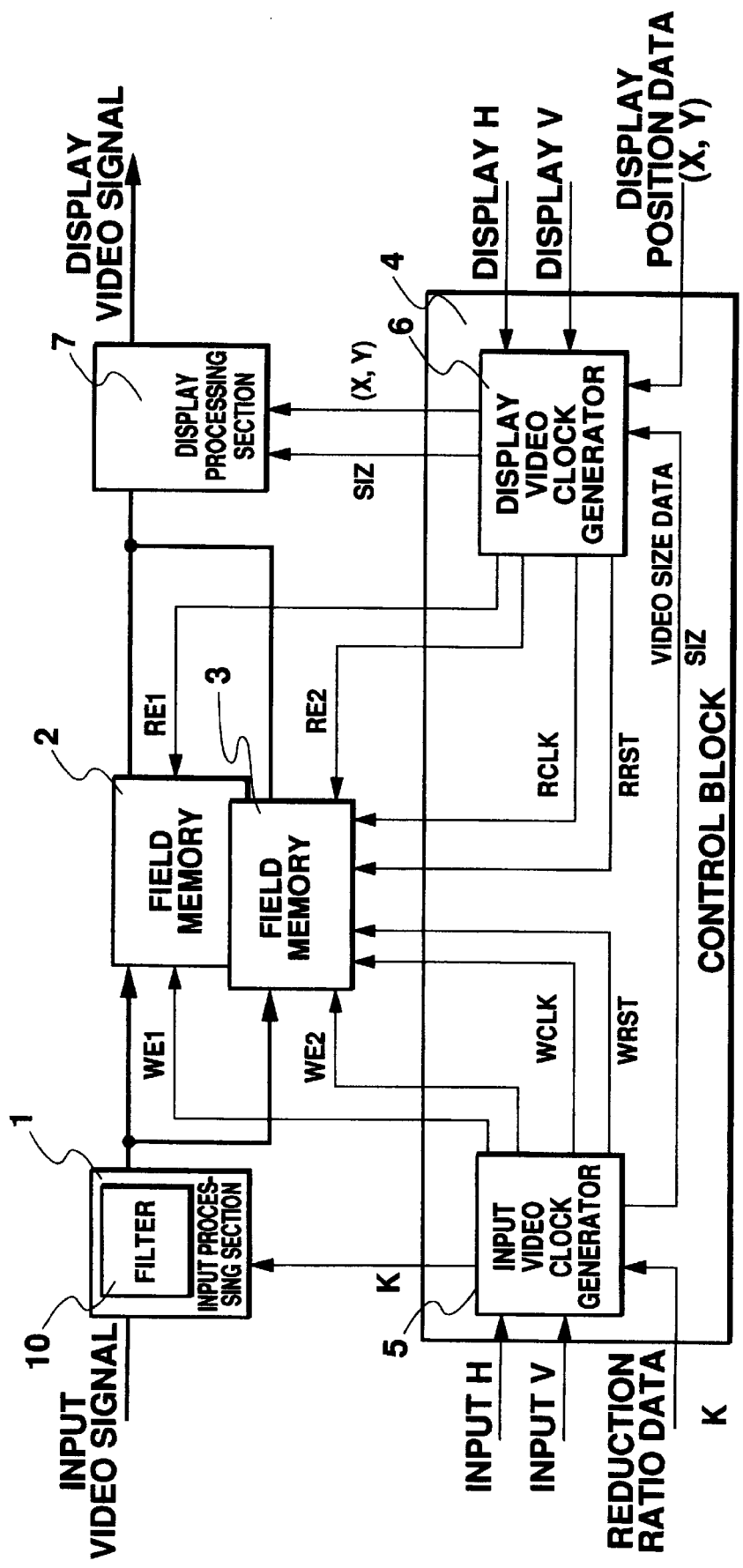
FIG. 6 is a block diagram illustrating a conventional reduced video signal processing circuit.

FIG. 1 is a block diagram illustrating a preferred embodiment of the present invention, wherein the same elements of those of the prior art shown in FIG. 6 are given the same reference numerals. A control block 20 comprises an input video clock generator 21 and a display video clock generator 22. Similar to the conventional input video clock generator 5, the input video clock generator 21 receives an input H, an input V, and size reduction ratio data K and outputs size reduction ratio data K, video size data (SIZ), a write clock (WCLK), a write reset signal (WRST), and write enabling signals (WE1, WE2), based on the received signals. Also similar to the conventional display video clock generator 6, the display video clock generator 24 receives a display H, a display V, display position data (X, Y), and video size data (SIZ), and outputs video size data (SIZ), a read clock (RCLK), a read reset signal (RRST), read enabling signals (RE1, RE2), and display position data (X, Y), based on the received signals.

Figure 2:
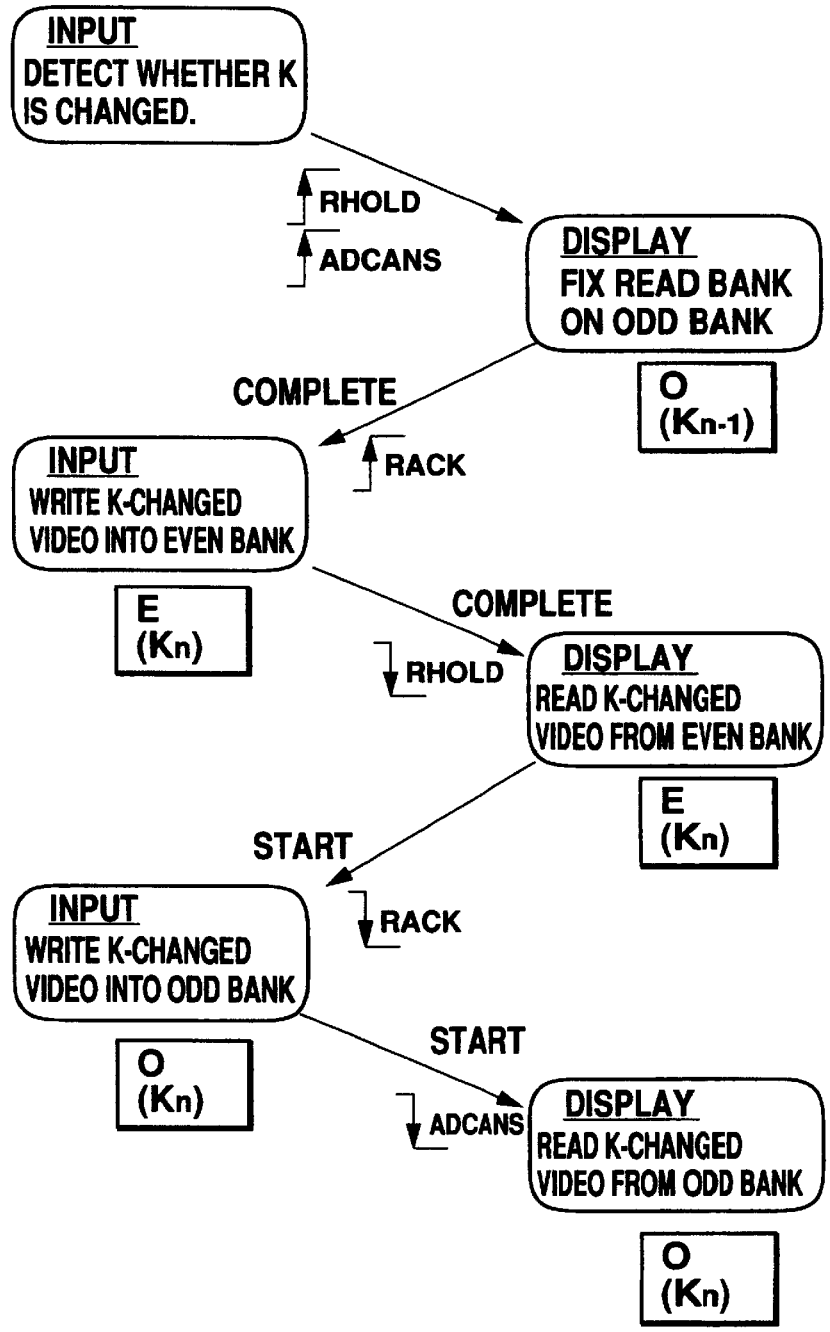
FIG. 2 is a diagram used for explaining an operation for changing a reduction ratio.

The generators 21 and 22 incorporate an input video reduction control section 23 and a display video reduction control section 24, respectively, for changing a reduction ratio, the control thereof being hereinafter described briefly with reference to FIG. 2.

Upon receipt of size reduction ratio data K from outside, the input video reduction control section 23 detects whether or not the value of the data K was changed during a blank interval of an input V. If it was changed, the control section 23 outputs a video size data hold signal (RHOLD) and a memory hold signal (ADCANS) both at an H (high) level to the display video reduction control section 24. Taking in the H-level RHOLD and ADCANS signals during a blank interval of a display V, the control section 24 prohibits taking-in of SIZ data, in response to the RHOLD signal, and selects a field memory to be fixed as a read memory, in response to the ADCANS signal. In this case, the control section 24 selects the field memory 2, so that the field memory 2 is fixed as a read memory. The control section 24 then outputs a memory fixing acknowledge signal (RACK) at an H level to the input video reduction control section 23, informing that a read memory was fixed on the field memory 2. At this stage, video data based on a previous reduction ratio data (a reduction ratio data before the change), i.e., data Kn–1, is read from the memory.

Receiving the H-level RACK signal during a blank interval of an input V, the input video reduction control section 23 fixes another field memory, namely, the field memory 3 for even fields, as a write memory, and outputs changed size reduction ratio data K to the input processing section 1. As a result, video data based on the changed size reduction ratio data K (K changed video) is written into the field memory 3, whereupon an RHOLD signal becomes an L (low) level. The input video reduction control section 23 computes SIZ data, based on the changed size reduction ratio data K, and outputs this SIZ data to the display video reduction control section 24. The display video reduction control section 24 takes in the SIZ data in response to the L-level RHOLD signal received during a blank interval of a video V. The control section 24 then outputs the SIZ data to a display processing section 7, and fixes a read memory then on the field memory 3 for even fields, so that video data based on the changed size reduction ratio data K is read for window display processing in the display processing section 7. At the start of reading of the video data, the RACK signal is changed into an L level. Receiving the L-level RACK signal during a blank interval of an input V, the input video reduction control section 23 switches a write memory from the field memory 3 to the field memory 2 for odd fields, so that video data for the next field is written into the field memory 2, changing an ADCANS signal into an L level. On the read side, receiving an L-level ADCANS signal during a blank interval of a display V, the control section 24 returns from a special control operation for a change of reduction ratio data to a normal control operation by starting a reading operation with respect to the field memory 2, that is, a memory different from a memory from which data was completely read, namely the field memory 3. Thereafter, alternate reading and writing operations are conducted to the field memories 2 and 3.

Concrete circuitry structures of the input video reduction control section 23 and the display video reduction control section 24 will next be described with reference to FIGS. 3 and 4, respectively.

Figure 3:
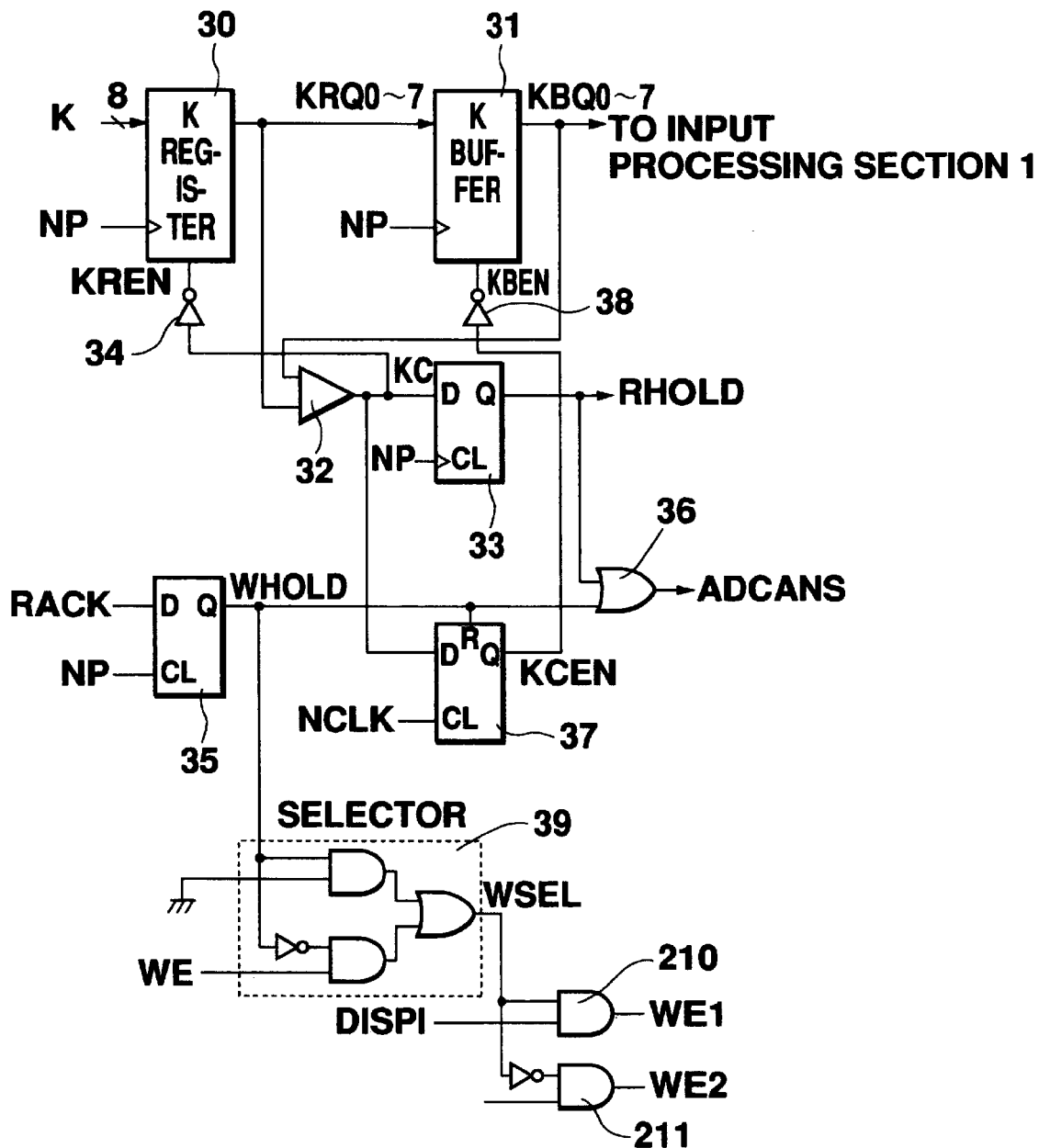
FIG. 3 illustrates a concrete circuit for an input video reduction control section.

As shown in FIG. 3, the input video reduction control section 23 comprises a K register 30, a K buffer 31, a comparator 32, D flip flops 33, 35, and 37, inventors 34 and 38, an OR gate 36, and a selector 39. The K register 30 takes in size reduction ratio data K upon receipt a timing signal (NP) indicating a blank interval of an input V. The K buffer 31 takes in the content of the K register 30 upon receipt of an NP signal, and provides its output to the input processing section 1. The comparator 32 compares the contents of the K register 30 and the K buffer 31, and outputs an L-level KC signal for the contents matched and an H-level KC signal for the contents unmatched. The output KC of the comparator 32 is latched by the D flip flop 33 upon receipt of an NP signal, and inverted via the invertor 34 to be supplied to the K register 30 as an enabling signal KREN. The D flip flop 35 latches the RACK signal received, upon receipt of an NP signal, and supplies a WHOLD signal to the OR gate 36. The OR gate 36, receiving a WHOLD signal and an RHOLD signal, outputs an ADCANS signal. Reset by an WHOLD signal, the D flip flop 37 latches a signal KC upon receipt of a pixel clock NCLK of an input video signal, and supplies its output to the invertor 38. The invertor 8 inverts the output from the D flip flop 37, and provides an enabling signal KBEN to the K buffer 31. The selector 39, receiving a fixed L-level signal at its first terminal and a write enable WE signal at its second terminal, selects the fixed L-level signal for an H-level WHOLD signal supplied, and the WE signal for an L-level WHOLD supplied, wherein the WE signal inverts its signal level alternately in synchronism with a rise of an input V. The input video clock generator 21, is further provided with AND gates 210 and 211. Each AND gate receives effective video period signal DISP1 at one end, while AND gate 210 receives a WSEL signal at the other terminal and AND gate 211 receives an inverted WSEL signal at the other terminal. The WSEL signal is output from the selector 39. The AND gates 210 and 211 respectively output WE1 and WE2 signals to the field memories 2 and 3.

Figure 4:
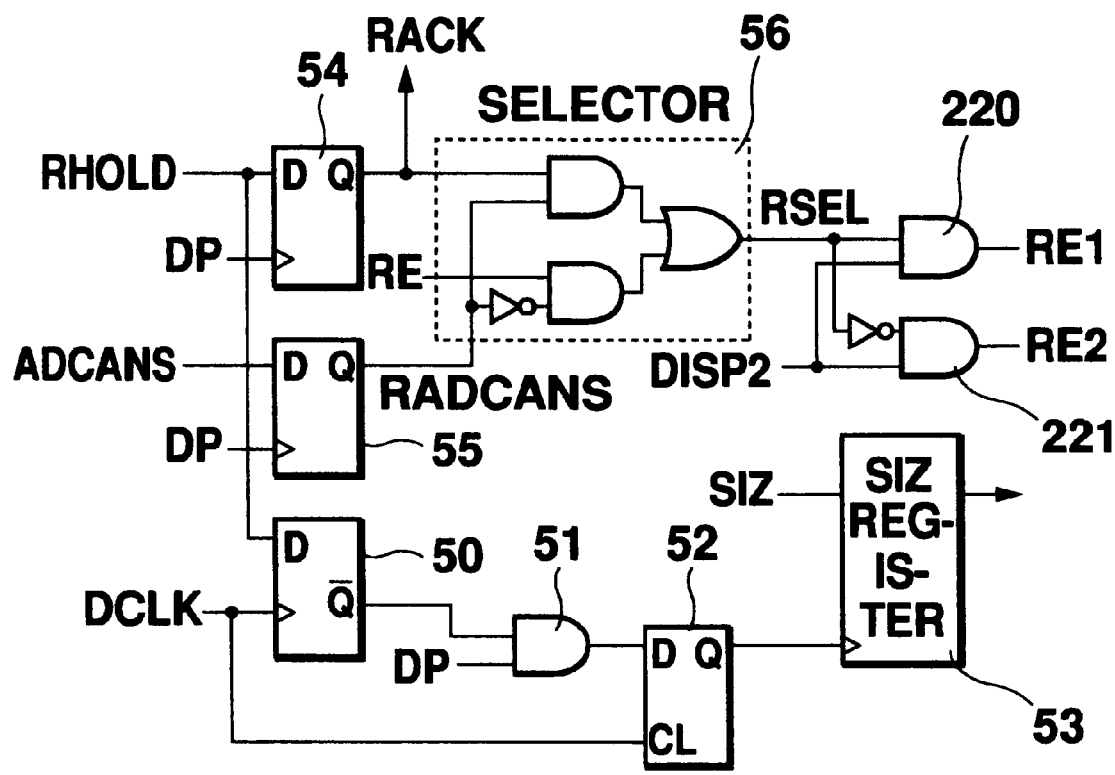
FIG. 4 illustrates a concrete circuit for a display video reduction control section.

As shown in FIG. 4, the display video reduction control section 24 comprises D flip flops 50, 52, 54, and 55, an AND gate 51, a size register 53, and a selector 56. Upon receipt of a pixel clock (dot clock) DCLK of a display video signal, the D flip flop 50 latches an RHOLD signal. The AND gate 51, receiving the inverted Q output of the D flip flop 50 and a DP signal indicating a blank interval of a display V, supplies its output to the D flip flop 52, so that the D flip flop 52 latches the output from the AND gate 51 upon receipt of a pixel clock DCLK. The size register 53 takes in SIZ data from the input video clock generator 21 in response to an output from the D flip flop 52. The D flip flop 54 latches an RHOLD signal from the input video reduction control section 23 upon receipt of a DP signal, and outputs a RACK signal. An ADCANS signal from the input video reduction section 23 is latched by the D flip flop 55 upon receipt of a DP signal. The selector 56, receiving a RACK signal at its first terminal and an RE signal at its second terminal, selects the RACK signal for an H-level RADCANS signal supplied from the D flip flop 55 and the RE signal for an L-level RADCANS signal, wherein the RE signal alternately inverts its signal level in synchronism with a rise of a display V. The display video clock generator 22 is also provided with AND gates 220 and 221 which receive an effective video period signal DISP2 at one end. AND gate 220 receives an RSEL signal at the other end while AND gate 211 receives an inverted RSEL signal at the other end. The RSEL signal is output from the selector 56. The AND gates 210 and 211 respectively output RE1 and RE2 signals to the field memories 2 and 3.

Figure 5:
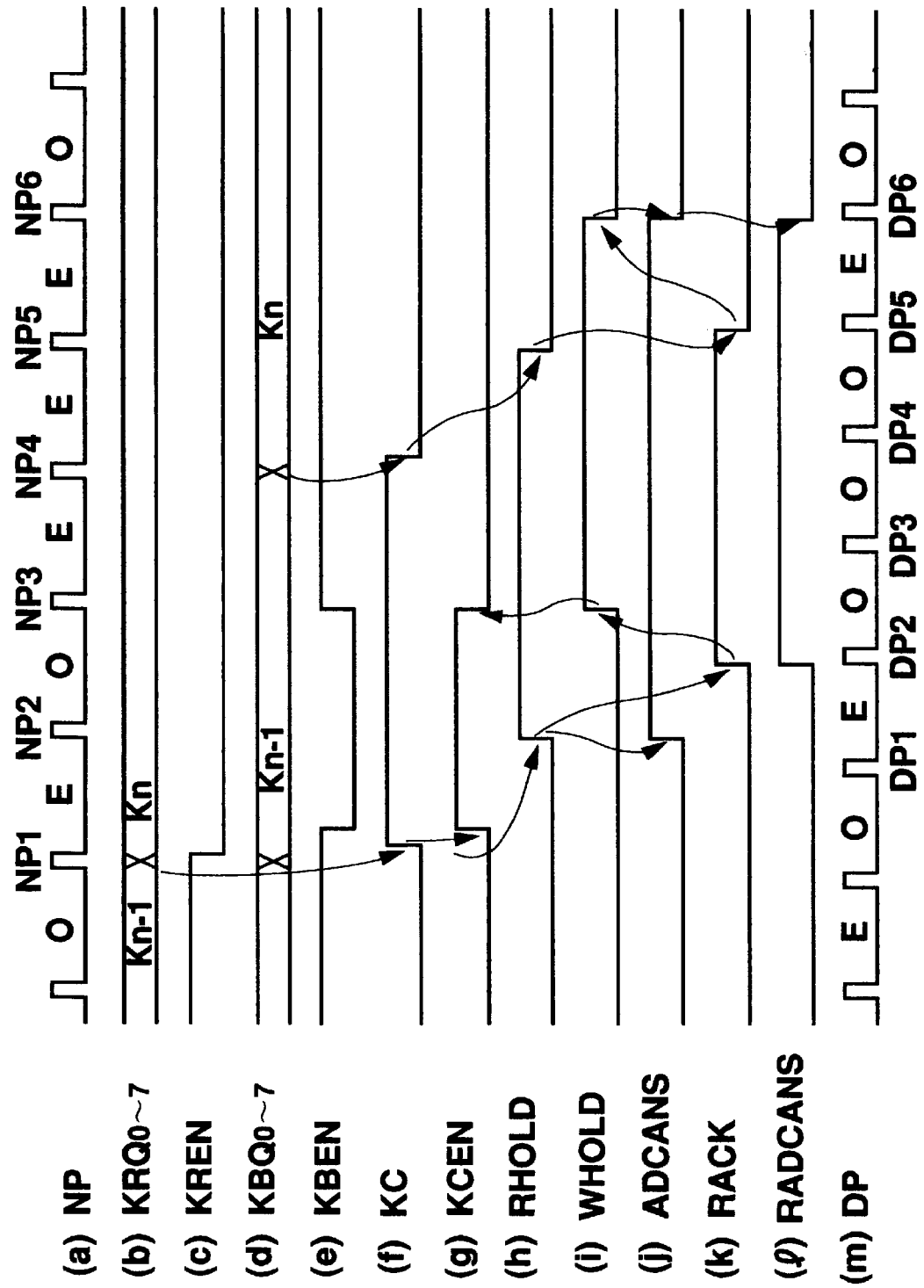
FIG. 5 is a timing chart used for explaining operations of the input video reduction control section and the display video reduction control section.

An operation of the above circuits will next be described with reference to the timing chart shown in FIG. 5.

When new size reduction ratio data Kn is supplied to the input video reduction control section 23, the incorporated K register 30 takes in the data Kn during a blank internal NP1 (a), as shown by KRQ0–7 (b) in the drawing. At this stage, since the K buffer contains data Kn−1, which is the data before the change, as is shown by KBQ0–7 (d), the comparator 32 outputs a KC signal (f) at an H level. Upon the rise of a KC signal (f), the invertor 34 turns a KREN signal (c) to be at an L-level to supply to the K register 30, whereby taking-in of new reduction ratio data is prohibited. Also, in response to the rise of a KC signal (f), the D flip flop 37 outputs an H-level KCEN signal (g), so that the K buffer 31 receives an L-level KBEN signal (e), as a result of which taking-in of new reduction ratio data is prohibited.

The KC signal (f) from the comparator 32 is taken in by the D flip flop 33 during the next vertical blank interval NP2 (a), which then turns an RHOLD signal (h) to become an H level. Since the H-level RHOLD signal (h) is output as an ADCANS signal (j) via the OR gate 36. That is, an ADCANS signal (j) is risen, becoming an H level, at this stage.

RHOLD (h) and ADCANS (j) signals are supplied to the display video reduction control section 24, and latched by the D flip flops 54 and 55, respectively, which then turn their output RACK (k) and RADCANS (1) signals to be at an H level during a vertical blank interval DP2 (m) of a display V. With an H-level RADCANS signal (1), the selector 56 selects a RACK signal (k). Since the RACK signal (k) is then at an H level, the AND gate 220 outputs an H-level RE1 signal, while the AND gate 221 outputs an L-level RE2 signal. As a result, a read memory is fixed on the field memory 2 for odd fields.

An H-level RHOLD signal (h) is also latched by the D flip flop 50, which outputs an inverted L-level signal. Due to the L-level signal, the size register 53 is supplied with no clock. As a result, the new video size data (SIZn) based on the new (changed) size reduction ratio data Kn is not taken in, although supplied from the input video clock generator 21, via the terminal D of the size register 53 in the display video reduction control section 24, and the SIZ data remains fixed.

Meanwhile, when a RACK signal (k) is sent to the input video reduction control section 23, the RACK signal (k) is latched by the D flip flop 35 during the next blank interval NP3 (a), whereby a WHOLD signal (i) becomes an H level. With an H-level WHOLD signal (i), the selector 39 selects a fixed L-level signal and thus outputs an L-level WSEL signal, so that the AND gate 210 outputs an L-level WE1 signal, while the AND gate 211 outputs an H-level WE2. As a result, the field memory 3 for even fields, that is, a memory different from a memory which was fixed as a read memory on the display side, is fixed as a write memory. Further, upon a rise of a WHOLD signal (i), the D flip flop 37 is reset, setting its output KCEN signal (g) at an L level. The buffer 31 then receives an H-level KBEN signal (e) and is thereby updated during the next blank interval NP4 (a) so as to contain the changed size reduction ratio data Kn. The buffer 31 then outputs the new data Kn to the input processing section 1, so that video data based on the new size reduction ratio data Kn is thus written into the field memory 3 for even fields. In addition, when the K buffer 31 is updated as described above, so as to have the same value as the content of the K register 30, the comparator 32 outputs an L-level KC signal (f). The D flip flop 33 takes in the L-level KC signal (f) during the next vertical interval NP5 (a), and in turn outputs an L-level RHOLD signal (h).

When an L-level RHOLD signal (h) is supplied to the display video reduction control section 24, the level of a RACK signal (k) of the D flip flop 54 is set to be at an L level during the blank interval DP5 (m). The selector 56, still selecting a RACK signal (k) due to an H-level RADCANS signal (1), then turns to output an L-level RSEL signal (due to an L-level RACK signal (k) taken in). As a result, an RE2 is now raised to an H level, so that the field memory 3 for even fields, containing video data written thereto based on the new size reduction ratio data Kn, is fixed as a read memory. Further, the D flip flop 50 also takes in an L-level RHOLD signal, and outputs an H-level signal (h). Upon this, the D flip flop 52 starts supplying a clock to the size register (?) 53, which then begins taking in the new video size data SIZ, so that the display video clock generator 22 outputs a control signal, based on the new video size data SIZ and display position data (X, Y) externally input, and also outputs the SIZ data and the data (X, Y) to the display processing section 7. As a result, video data reduced at the new reduction ratio is thus read from the field memory 3 under read control corresponding to the new reduction ratio, so that the display processing section 7 can execute appropriate window display processing corresponding to the new reduction ratio.

Further, when a RACK signal (k) becomes an L level, an output WHOLD signal (i) of the D flip flop 35 also becomes an L level during a blank interval NP6 (a), and an ADCANS signal (j) is accordingly turned to be at an L level in the input video reduction control section 23. With the WHOLD signal (i) at an L level, the selector 39 selects a WE signal, as a result of which compulsory fixing of a write memory is released, whereby the signal processing operation returns to a normal operation where the field memories 2 and 3 are selected alternately based on a WE signal.

In the display video reduction control section 24, on the other hand, a RADCANS signal (1) becomes an L level during a blank interval DP6 in response to an ADCANS signal (1) becoming an L level. As a result, compulsory fixing of a write memory is released, whereby a signal processing operation returns to a normal procedure where the selector 56 selects an RE signal for selection of alternate field memories 2 and 3 based on the selected RE signal.

Figure 7:
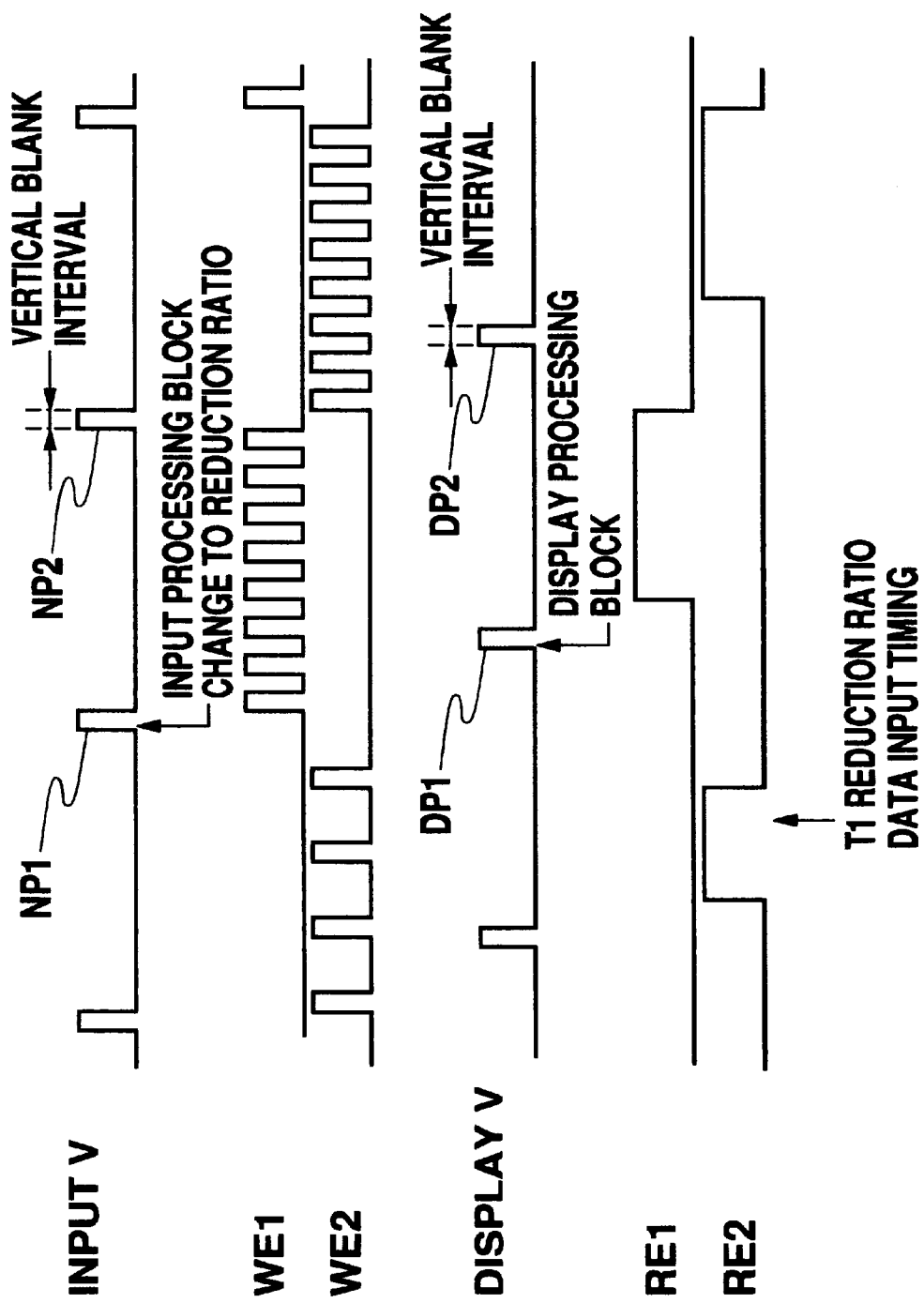
FIG. 7 is a timing chart used for explaining an operation of a reduced video signal processing circuit.
Figure 8:
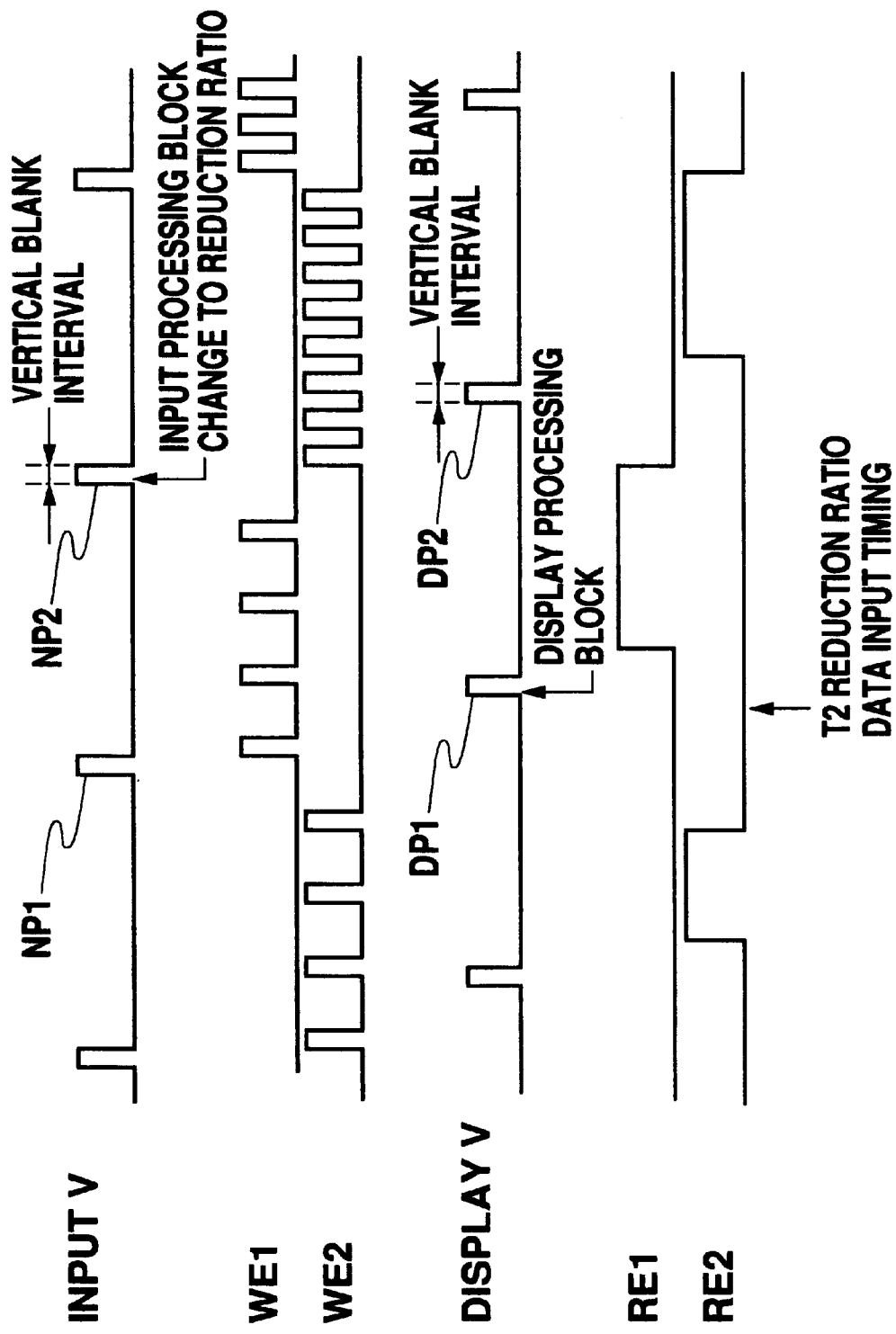
FIG. 8 is a timing chart used for explaining another operation of a reduced video signal processing circuit.
Figure 9:
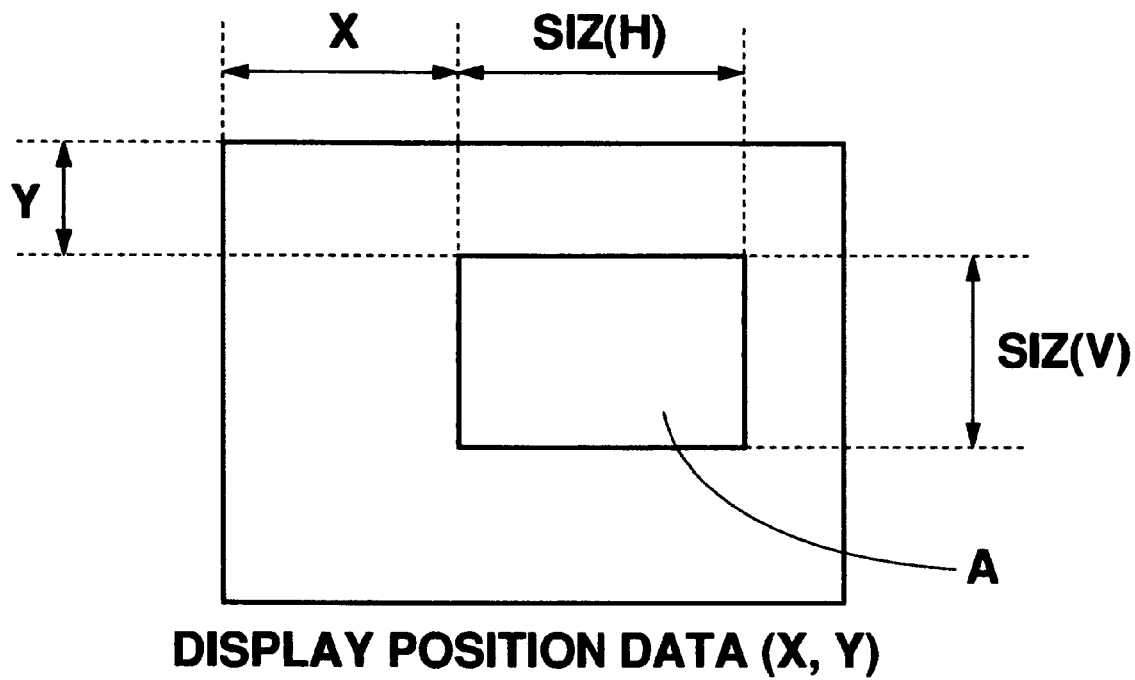
FIG. 9 illustrates an example of a display window.

The foregoing operation for a change of a reduction ratio K makes it possible to change a reduction ratio without causing distortion to a video displaying in the form of a window, even if new size reduction ratio data K is input at either time T1 or T2, as shown in FIGS. 7 and 8.

In other words, according to the present invention, a video can always be subjected to appropriate display processing which corresponds to a changed reduction ratio whenever a change is made. As a result, a reduction ratio can be changed at any time while a reduced video remains displayed in a window, in particular, while preventing distortion on the video displaying.

What is claimed is:

1. A reduced video processing circuit for obtaining a display video signal by reducing an input video signal according to a reduction ratio to form reduced video data which is written into two buffer memories alternately so that reduced video data written is read from the two buffer memories alternately, comprising:

a reduction processing circuit for reducing an input video signal according to reduction ratio data to form a reduced video data;

first and second buffer memories to which reduced video data is written alternately; and a read control circuit and a write control circuit for controlling writing and reading with respect to the buffer memories, respectively, according to the reduction ratio data;

wherein the read control circuit includes a display reduction control circuit for taking in a first and second control signals from the write control circuit during a vertical blank interval of a display video signal; and the write control circuit includes an input reduction control circuit for taking in a third control signal from the read control circuit during a vertical blank interval of an input video signal;

the input reduction control circuit detects a change of the reduction ratio data and sets the first and second signals to be at a first level;

the display reduction control circuit fixes a read memory on the first buffer memory and sets the third control signal to be at the first level, in response to the first and second control signals being at the first level;

the input reduction control circuit fixes a write memory on second buffer memory to write video data thereto at a new reduction ratio and turns the first control signal to be at a second level, in response to the third control signal being at the first level;

the display reduction control circuit fixes a read memory on the second buffer memory to read video data therefrom at a new reduction ratio and turns the third control signal to be at the second level, in response to the first control signal being at the second level;

the input reduction control circuit releases fixing of the write memory and turns the first control signal to be at the second level, in response to the third control signal being at the second level; and the display reduction control circuit releases fixing of the read memory in response to the first control signal being at the second level.

2. A reduced video processing circuit according to claim 1, further comprising:

a display processing circuit for executing window display processing to reduced video data according to video size data based on the reduction ratio data, the reduced video data being read from the buffer memories; wherein the input reduction control circuit detects a change of the reduction ratio data and sets the first and second control signals to be at the first level, the display reduction control circuit fixes a read memory on the first buffer memory, sets the third control signal to be at the first level, and prohibits a change of the video size data, in response to the first and second control signals being at the first level, the input reduction control circuit fixes a write memory on the second buffer memory to write video data thereto at a new reduction ratio, turns the first control signal to be at the second level, and outputs new video size data corresponding to the new reduction ratio, in response to the third control signal being at the first level, and the display reduction control circuit takes in the new video size data, fixes a read memory on the second buffer memory to read video data therefrom at a new reduction ratio, and turns the third control signal to be at the second level, in response to the first control signal being at the second level.

3. A reduced video processing circuit, according to claim 1, wherein a read memory and a write memory are switched during a vertical blank interval of an input video signal and a display video signal, respectively.

4. A reduced video processing circuit, according to claim 3, wherein a write clock used for writing an input video signal into the memories and a read clock used for reading a display video signal from the memories are different from each other.

5. A reduced video processing circuit comprising:

a reduction processing circuit for reducing an input video signal according to a reduction ratio to form a reduced video data;

first and second buffer memories to which the reduced video data from the reduction processing circuit is written alternately;

a write control circuit coupled to a reduction ratio data input for controlling the alternate writing of the reduced video data to the first and second memories, the write control circuit generating a video size data according to the reduction ratio data input; and a read control circuit for controlling alternate reading of the reduced video data from the first and second memories, the read control circuit coupled to the write control circuit for receiving the video size signal and for transmitting control signals between the read and write control circuits;

wherein the write control circuit is operable, in response to a change in the reduction ratio data input, to transmit a first control signal to the read control circuit;

the read control circuit is operable, in response to receiving the first control signal, to fix a read memory on the first buffer memory and to read the video data therefrom according to the video size signal received prior to receiving the first control signal, and to transmit a second control signal to the write control circuit;

the write control circuit is operable, in response to receiving the second control signal, to fix a write memory on the second buffer memory and to write the reduced video data thereto according to the changed reduction ratio data input, and to transmit a third control signal to the read control circuit;

the read control circuit is operable, in response to receiving the third control signal, to fix a read memory on the second buffer memory, to read the video data therefrom according to the changed video size data, and to transmit a fourth control signal to the write control circuit;

the write control circuit is operable, in response to receiving the fourth control signal, to release fixing of the write memory and transmits a fifth control signal to the read control circuit; and wherein the read control circuit is operable, in response to receiving the fifth control signal, to release fixing of the read memory.

6. The reduced video processing circuit of claim 5, wherein the control signals transmitted by the write control circuit are received by the read control circuit according to a timing of a clock of the read control circuit, and the control signals transmitted by the read control circuit are received by the write control circuit according to a timing of a clock of the write control circuit.

7. The reduced video processing circuit of claim 6, wherein the clock of the write control circuit is a vertical blank interval of an input video signal, and the clock of the read control circuit is a vertical blank interval of a display video signal.

8. The reduced video processing circuit of claim 6, wherein the reduced video data is written into the first and second memories according to a write clock, and read therefrom according to a read clock different from the write clock.

9. The reduced video processing circuit of claim 5, further comprising a display processing circuit coupled to the first and second memories and the read control circuit for executing window display processing to the reduced video data read from the first and second memories according to video size data provided by the read control circuit.

10. A method of obtaining a display video signal by reducing an input video signal according to a reduction ratio to form reduced video data which is written into a first and a second buffer memory alternately so that reduced video data written is read from the first and the second buffer memory alternately, the writing and reading of data being controlled by a write control circuit and a read control circuit, respectively, the method comprising:

transmitting a first control signal from the write control circuit to the read control circuit in response to a change in the reduction ratio data input;

fixing a read memory on the first buffer memory in response to the first control signal to read the video data therefrom;

transmitting a second control signal from the read control circuit to the write control circuit;

fixing a write memory on the second buffer memory in response to the second control signal to write the reduced video data thereto;

transmitting a third control signal from the write control circuit to the read control circuit;

fixing a read memory on the second buffer memory in response to the third control signal to read the video data therefrom;

transmitting a fourth control signal from the read control circuit to the write control circuit;

releasing the fixing of the write memory in response to the fourth control signal;

transmitting a fifth control signal from the write control circuit to the read control circuit; and releasing the fixing of the read memory in response to the fifth control signal.

11. A method of obtaining a display video signal according to claim 10, wherein a read memory and a write memory are switched during a vertical blank interval of an display video signal and a input video signal, respectively.

12. A method of obtaining a display video signal according to claim 11, wherein reading from the buffer memories is executed according to a video size based on the reduction ratio, the video size is prohibited from being updated until reading from the second buffer memory is started; and the video size is updated to be a video size corresponding to a new reduction ratio at execution of reading from the second buffer memory.

13. The method of claim 10, wherein in the step of fixing the read memory on the first buffer memory, the read memory is fixed on the first buffer memory in accordance with the timing of a signal synchronized to the display video signal; wherein in the step of fixing a write memory on the second buffer memory, the write memory is fixed on the second buffer memory in accordance with the timing of a signal synchronized to the input video signal; and wherein in the switching step, the read memory is switched in accordance with the timing of a signal synchronized to the display video signal.

* * * * *